United States Patent
Mekala et al.

(10) Patent No.: US 10,775,315 B2
(45) Date of Patent: Sep. 15, 2020

(54) PROBE INSERTION SYSTEM

(71) Applicant: General Electric Company, Schenectady, NY (US)

(72) Inventors: Rajesh Mekala, Bangalore (IN); Bellary Madhusudan Rao, Bangalore (IN); Vinay Chaugule, Bangalore (IN); Ileana Prisabel Corona, Poza Rica (MX); Ramon Reyes, Queretaro (MX); Ramon Ulises Villarreal, Queretaro (MX); Ramakrishnan Sethuraman, Bangalore (IN)

(73) Assignee: General Electric Company, Schenectady, NY (US)

( * ) Notice: Subject to any disclaimer, the term of this patent is extended or adjusted under 35 U.S.C. 154(b) by 339 days.

(21) Appl. No.: 15/914,469

(22) Filed: Mar. 7, 2018

(65) Prior Publication Data
US 2019/0277770 A1  Sep. 12, 2019

(51) Int. Cl.
*G01N 21/88* (2006.01)
*G01N 21/954* (2006.01)

(52) U.S. Cl.
CPC ....... *G01N 21/8806* (2013.01); *G01N 21/954* (2013.01); *G01N 2021/9546* (2013.01)

(58) Field of Classification Search
None
See application file for complete search history.

(56) References Cited

U.S. PATENT DOCUMENTS 3,557,780 A * 1/1971 Sato ............... A61B 1/0055
                                                  600/141
3,694,094 A   9/1972 Mitchell
3,778,170 A * 12/1973 Howell ............ G02B 23/2476
                                                  356/241.4

(Continued)

FOREIGN PATENT DOCUMENTS

EP         1216796 A1    6/2002
WO    WO2017/165810 A1   9/2017

OTHER PUBLICATIONS

U.S. Appl. No. 15/812,004, filed Nov. 14, 2017.
(Continued)

*Primary Examiner* — Kara E. Geisel
*Assistant Examiner* — Jarreas C Underwood
(74) *Attorney, Agent, or Firm* — Hanley, Flight & Zimmerman, LLC

(57) ABSTRACT

Systems for inserting and orienting a soft robotic probe into an apparatus and capturing images and methods of using the same are generally disclosed. For example, the system includes a cable, an actuation assembly, and a camera at the tip of the probe. The cable includes an adjustable sheath at an exterior of the cable defined around a probe centerline extending the length of the probe. The adjustable sheath extends and contracts the cable between a first length and a second length different from the first length and is defined within the adjustable sheath. The actuation assembly extends or contracts the cable between the first length and the second length and further adjusts an orientation of the cable, an orientation of the tip of the probe, or both along at (Continued)

least one axis. The camera captures images at least partially around a circumferential direction relative to a camera centerline.

20 Claims, 11 Drawing Sheets

(56) References Cited

U.S. PATENT DOCUMENTS

| | | | |
|---|---|---|---|
| 4,659,195 A * | 4/1987 | D'Amelio | F01D 21/003 |
| | | | 359/503 |
| 4,699,463 A | 10/1987 | D'Amelio et al. | |
| 5,155,941 A * | 10/1992 | Takahashi | A61B 1/0051 |
| | | | 408/16 |
| 5,251,611 A * | 10/1993 | Zehel | A61B 1/0055 |
| | | | 600/114 |
| 5,253,638 A | 10/1993 | Tamburrino et al. | |
| 5,345,339 A | 9/1994 | Knieriem et al. | |
| 5,549,542 A | 8/1996 | Kovalcheck | |
| 5,850,469 A | 12/1998 | Martin et al. | |
| 6,124,974 A | 9/2000 | Burger | |
| 6,134,003 A | 10/2000 | Tearney et al. | |
| 6,416,462 B1 * | 7/2002 | Tovey | A61B 1/00142 |
| | | | 206/363 |
| 6,483,535 B1 | 11/2002 | Tamburrino et al. | |
| 6,560,013 B1 | 5/2003 | Ramsbottom | |
| 6,753,876 B2 | 6/2004 | Brooksby et al. | |
| 6,793,399 B1 | 9/2004 | Nguyen | |
| 7,064,811 B2 | 6/2006 | Twerdochlib | |
| 7,171,279 B2 | 1/2007 | Buckingham et al. | |
| 7,901,348 B2 | 3/2011 | Soper et al. | |
| 7,914,446 B2 | 3/2011 | Keller | |
| 8,139,103 B2 | 3/2012 | McGrew | |
| 8,311,738 B2 | 11/2012 | Politick et al. | |
| 8,485,038 B2 | 7/2013 | Sengupta et al. | |
| 8,602,722 B2 | 12/2013 | George et al. | |
| 8,950,004 B2 | 2/2015 | Messinger et al. | |
| 9,002,112 B2 | 4/2015 | France | |
| 9,026,247 B2 | 5/2015 | White et al. | |
| 9,036,892 B2 | 5/2015 | Domke et al. | |
| 9,149,929 B2 | 10/2015 | Motzer et al. | |
| 9,218,470 B2 | 12/2015 | Domke et al. | |
| 9,458,735 B1 | 10/2016 | Diwinsky et al. | |
| 9,476,823 B2 | 10/2016 | Ward et al. | |
| 9,551,620 B2 | 1/2017 | Singh et al. | |
| 9,641,125 B2 | 5/2017 | Johnston | |
| 9,710,573 B2 | 7/2017 | Messinger et al. | |
| 9,715,100 B2 | 7/2017 | Konomura et al. | |
| 2005/0199832 A1 | 9/2005 | Twerdochlib | |
| 2006/0025668 A1 | 2/2006 | Peterson et al. | |
| 2006/0094931 A1 * | 5/2006 | Danitz | A61M 25/0105 |
| | | | 600/141 |
| 2006/0247511 A1 | 11/2006 | Anderson | |
| 2007/0112250 A1 * | 5/2007 | Kura | A61B 1/31 |
| | | | 600/114 |
| 2008/0186018 A1 | 8/2008 | Anderson | |
| 2008/0238413 A1 | 10/2008 | Anderson | |
| 2008/0243064 A1 | 10/2008 | Stahler et al. | |
| 2009/0079426 A1 | 3/2009 | Anderson | |
| 2009/0096443 A1 | 4/2009 | Anderson | |
| 2009/0118620 A1 | 5/2009 | Tgavalekos et al. | |
| 2010/0113917 A1 | 5/2010 | Anderson | |
| 2012/0105619 A1 | 5/2012 | PallikkaraGopalan et al. | |
| 2012/0113209 A1 * | 5/2012 | Ritchey | G02B 27/0179 |
| | | | 348/14.02 |
| 2012/0203067 A1 | 8/2012 | Higgins et al. | |
| 2013/0113915 A1 | 5/2013 | Scheid et al. | |
| 2013/0135457 A1 * | 5/2013 | Kell | G01M 15/14 |
| | | | 348/82 |
| 2014/0098091 A1 | 4/2014 | Hori | |
| 2014/0207419 A1 | 7/2014 | Messinger et al. | |
| 2015/0022655 A1 | 1/2015 | Ruhge | |
| 2015/0172567 A1 | 6/2015 | Ekeroth | |
| 2015/0319410 A1 | 11/2015 | Gu et al. | |
| 2015/0341600 A1 | 11/2015 | Hatcher, Jr. et al. | |
| 2016/0025653 A1 | 1/2016 | Jalilian et al. | |
| 2016/0088204 A1 | 3/2016 | Liang et al. | |
| 2016/0178533 A1 | 6/2016 | Gladnick | |
| 2017/0122123 A1 | 5/2017 | Kell et al. | |
| 2017/0148309 A1 | 5/2017 | Messinger et al. | |
| 2017/0167285 A1 | 6/2017 | Diwinsky et al. | |
| 2017/0167289 A1 | 6/2017 | Diwinsky et al. | |
| 2017/0223273 A1 | 8/2017 | Bendall et al. | |

OTHER PUBLICATIONS

U.S. Appl. No. 15/671,502, filed Aug. 8, 2017.
U.S. Appl. No. 15/278,541, filed Sep. 28, 2016.
Zhang, Researchers Unveil World's Smallest Camera the Size of a Grain of Salt, PetaPixel, Mar. 10, 2011, 2 pages. https://petapixel.com/2011/03/10/researchers-unveil-worlds-smallest-camera-the-size-of-a-grain-of-salt.
http://www.fiberscope.net/1-6-thin-video-borescope.html, Feb. 2, 2018.
Choset, Medical Snake Robot, Medical Robotics, Carnegie Mellon University, Robotics Institute, Biorobotics Laboratory, 3 pages. https://medrobotics.ri.cmu.edu/node/128447.
Chen, et al., Disposable Endoscope Tip Actuation Design and Robotic Platform, 2010 Annual International Conference of the IEEE Engineering in Medicine and Biology, Buenos Aires, 2010, pp. 2279-2282. doi: 10.1109/IEMBS.2010.5627677 http://ieeexplore.ieee.org/document/5627677/ or https://www.ncbu.nlm.nih.gov/pubmed/21097015.
Ranzani, et al., A bioinspired soft manipulator for minimally invasive surgery, The BioRobotics Institute, Scuolo Superiore Sant' Anna (SSSA) Viale Rinaldo Piaggio 34, 56025 Pontedera (PI), Italy, 17 pages, May 2015.
Ranzani, et al., A Modular soft manipulator with variable stiffness, 3$^{rd}$ Joint Workshop on New Technologies for Computer/Robot Assisted Surgery, The BioRobotics Institute, Sep. 2013, Italy. pp. 4.

* cited by examiner

PROBE INSERTION SYSTEM

FIELD

The present subject matter relates generally to a probe for inspection of an apparatus, and more particularly to a system and method for automated soft robotic probe insertion into an apparatus.

BACKGROUND

Optical scopes are used as an inspection tool to view inside an apparatus such as a turbomachine or engine. Optical scopes, such as borescopes, include a removable optical adapter tip at an end of the optical scope. The optical adapter is generally suited for various purposes, such as providing a discrete direction of view. The optical scope, including the optical adapter, is ingressed into the apparatus for viewing and assessing internal components.

In order to allow for periodic inspection of internal parts of the engine (e.g., blades, vanes, shrouds, disks, frames, etc.), borescope ports are typically provided in the engine casings and/or frames. Such ports allow optical borescope instruments to be inserted into the core engine to enable a visual inspection of the engine to be performed without requiring disassembly of the engine components. However, once an instrument has been inserted into a borescope port, minimal information is typically available to an inspector regarding the actual position of the instrument within the engine, leading to errors in measurements and reducing the efficiency of performing the visual inspection.

Adding to these inefficiencies, many borescope examinations are controlled physically by the inspector. For example, the inspector inserts and manipulates the borescope to achieve the desired view of the apparatus. This manual control of the borescope can lead to irregular and/or inconsistent images captured during the insertion of the borescope probe, thereby reducing the quality of the borescope inspection. Further, trial and error of the human operator can lead to longer inspection times, increased maintenance costs, loss or damage of the borescope within the apparatus, and/or damage to the apparatus. Additionally, borescope inspection of an engine often must wait for the engine to cool sufficiently from its previous flight. For instance, the engine may be too hot for the human operator, the materials constituting the probe, or both.

As such, there is a need for a system and method of borescope examination that may mitigate borescope insertion trial and error, improve inspection quality, improve inspection time and cost, and mitigate losses and damages to the borescope or surrounding apparatus.

BRIEF DESCRIPTION

Aspects and advantages will be set forth in part in the following description, or may be obvious from the description, or may be learned through practice of the invention.

In one aspect, the present disclosure is directed to a system for inserting and orienting a soft robotic probe into an apparatus and capturing images. The system includes a cable, an actuation assembly, and a camera at the tip of the probe. The cable includes an adjustable sheath at an exterior of the cable. The adjustable sheath is defined around a probe centerline extending the length of the probe. As such, the adjustable sheath extends and contracts the cable between a first length and a second length different from the first length. The actuation assembly is defined within the adjustable sheath. The actuation assembly extends or contracts the cable between the first length and the second length. Further, the actuation assembly adjusts an orientation of the cable, an orientation of the tip of the probe, or both along at least one axis. The camera captures images at least partially around a circumferential direction relative to a camera centerline.

In another embodiment, the system further includes a computer communicatively coupled to the probe. The computer may be configured to guide the probe on a predetermined path through the apparatus and capture images at regular intervals. Additionally, the computer may be configured to combine images captured at the regular intervals into a single composite image of the apparatus along the predetermined path.

In a further embodiment, the adjustable sheath includes a crimped braided sheath. In another exemplary embodiment, the actuation assembly is coupled to an actuation source. The actuation source may be configured to receive a signal and elongate or shorten the actuation assembly. In a still further embodiment, the system includes a stiffening device extending the length of the cable and housed within the adjustable sheath. The stiffening device provides rigidity to the cable. In a further embodiment, the at least one stiffening device is coupled to at least one stiffening source. As such, the stiffening source may be configured to receive a signal and provide rigidity to the stiffening device. In another exemplary embodiment, the actuation assembly, the stiffening device, or both are coupled to a pressure source.

In one embodiment, the probe further includes a slip ring. The slip ring may be coupled to the camera and the cable. Further, the slip ring may rotate the camera along the circumferential direction. In another exemplary embodiment, the camera is rotates between a first position and a second position along the circumferential direction. In a still further embodiment, the system includes a plurality of cameras at the tip of the probe. The cameras may be oriented at different locations along the circumferential direction relative to the camera centerline. In another embodiment, the camera centerline is at a distance from the centerline of the probe.

In one exemplary embodiment, the probe further includes a plurality of slidable segments. The slidable segments may extend along the length of the cable. In another embodiment, the second length is approximately five times longer or more than the first length.

In another aspect, the present disclosure is directed toward a method for inserting and orienting a soft robotic probe into an apparatus and capturing images. The method includes inserting a probe including a soft robotic cable and a camera into an access port of the apparatus. In another step, the method includes sending signals from a computer to orient and feed the probe along a predetermined path through the apparatus. In a further step, the method includes transmitting images captured by the camera to the computer installed with video processing instructions.

In one embodiment, the method further includes generating a composite image based on the combined captured images. The composite image may approximately represent a complete view of the apparatus along the predetermined path. In another embodiment, the method includes halting the probe at predetermined locations to capture images radially from the camera of the probe. Further, the images captured together may show views of the apparatus at least partially around a circumference of a camera centerline. In a still further embodiment, the method includes capturing images continuously along the predetermined path through the apparatus.

In one exemplary embodiment, the method includes detecting an undesirable characteristics on an exterior surface of the apparatus, on an interior surface of the apparatus, or both using the composite image. In another embodiment, method further includes capturing views of a first portion of the apparatus while the probe is inserted into the apparatus, changing the orientation of the camera, and withdrawing the probe from the apparatus while capturing views of a second portion of the apparatus. In a still further embodiment, the method includes combining the captured images using at least one of image stitching and unwrapping with seam blending, histogram-based image enhancement, image registration, scale invariant feature extraction and pattern matching, or machine learning.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
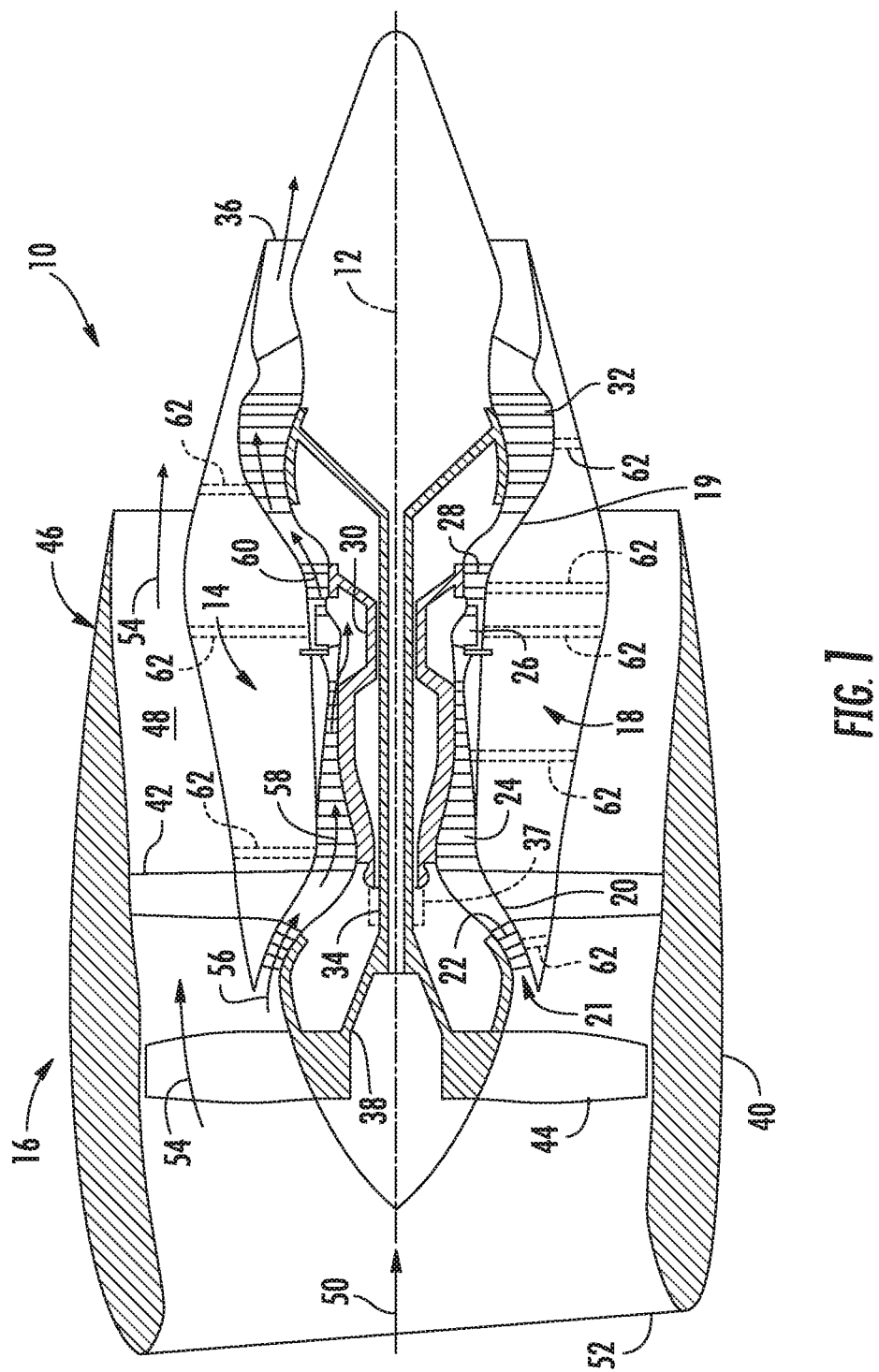
FIG. 1 illustrates a cross-sectional view of one embodiment of a gas turbine engine that may be utilized in accordance with aspects of the present subject matter.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, words in the singular include the plural, and words in the plural include the singular, in each case as the context may require.

A system is generally provided for inserting and orienting a soft robotic probe into an apparatus and capturing images. As shown, the system includes a cable, an actuation assembly, and a camera. The cable includes an adjustable sheath at the exterior of the cable. The adjustable sheath is defined around a probe centerline that extends the length of the probe. As such, the adjustable sheath extends and contracts the cable between a first length and a second length. For example, the second length is different from the first length. Further, the actuation assembly is defined within the adjustable sheath. The actuation assembly extends or contracts the cable between the first length and the second length. Additionally, the actuation assembly adjusts an orientation of the cable, an orientation of the tip of the probe, or both along at least one axis. The camera is located at a tip of the probe. Further, the camera captures images at least partially around a circumferential direction relative to a camera centerline. In one embodiment, the system includes a stiffening device. For example, the stiffening device extends the length of the cable and is housed within the adjustable sheath. As such, the stiffening device provides rigidity to the cable.

In certain embodiments, automatic insertion of a soft robotic probe via a computer eliminates the need for human trial and error in orienting and inserting the probe. Additionally, the elimination of a physically present inspector may allow for engine inspections sooner after engine operation. More specifically, the engine may be inspected while it is too hot for a human inspector to manually manipulate the borescope. In certain other embodiments, images captured along predetermined paths at predetermined locations can produce a consistent composite image across different inspections and different engines. As such, inspectors can examine similar inspection images, despite differences in the inspector, to detect defects, corrosion, or damage to the engine. Such an inspection process can improve interpretation and comparison of images against serviceability limits and lead to a quicker return of the engine to service. Furthermore, this system may be adapted for use with a wide variety of commercially available borescopes and for inspecting any apparatus. Further, the disclosed system can lead to reduced maintenance costs, avoidance of loss or damage to the probe within the apparatus, and/or prevention of damage to the apparatus.

It should be appreciated that, although the present subject matter will generally be described herein with reference to inserting and guiding an optical probe within a gas turbine engine, the disclosed system and method may be generally used to insert any probe within a gas turbine engine and determine the location of the probe. For instance, the system and method may be used to insert and guide a repair probe to be inserted within a gas turbine engine via one of its access ports to allow for a given repair procedure to be performed within the engine. In other embodiments, the probe may be a range finder, a laser rangefinder, a proximity sensing probe, a LIDAR probe, and/or a RADAR probe.

It should also be appreciated that the disclosed system and method may generally be used to insert probes within any suitable type of turbine engine, including aircraft-based turbine engines, land-based turbine engines, and/or steam turbine engines, regardless of the current assembly state of the engine (e.g., fully or partially assembled). Additionally, with reference to aircraft engines, it should be appreciated that the present subject matter may be used on wing or off wing.

Furthermore, it should be appreciated that, although the present subject matter will generally be described herein with reference to inserting an optical probe within a gas turbine engine, the disclosed system and method may be generally used to insert any probe within any type of apparatus. For example, the system and method may generally be used on any apparatus with internal structure that is difficult to access and/or inspect. In certain other embodiments, the probe may be inserted within any apparatus such as a mechanical or organic body with cavities, orifices, tubes, etc. for the examination thereof. Further, in other embodiments, the probe may be used for medical purposes, such as insertion into an orifice of a human or an animal.

Referring now to the drawings, FIG. 1 illustrates a cross-sectional view of one embodiment of an apparatus 10 that the system 200 (see e.g., FIG. 4) may be utilized in. The apparatus 10 is shown having a longitudinal or axial centerline axis 12 extending therethrough for reference purposes. In the depicted embodiment, the apparatus 10 is a gas turbine engine. It should be recognized that, in other embodiments, the apparatus may be any other mechanical or organic body with cavities, orifices, tubes, etc. for the examination thereof.

In general, the gas turbine engine may include a core gas turbine engine (indicated generally by reference character 14) and a fan section 16 positioned upstream thereof. The core engine 14 may generally include a substantially tubular outer casing 18 that defines an annular inlet 21. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high pressure compressor 24 may then flow to a combustor 26 within which fuel is injected into the flow of pressurized air, with the resulting mixture being combusted within the combustor 26. For the illustrated embodiment, the high energy combustion products 60 are directed from the combustor 26 along the hot gas path of the gas turbine engine to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. In the exemplary embodiment, after driving each of turbines 28 and 32, the combustion products 60 may be expelled from the core engine 14 via an exhaust nozzle 36 to provide propulsive jet thrust.

Additionally, as shown in FIG. 1, the fan section 16 of the gas turbine engine may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) 37 may also be provided between any other suitable shafts and/or spools within the gas turbine engine as desired or required.

During operation of the gas turbine engine, it should be appreciated that an initial air flow (indicated by arrow 50) may enter the gas turbine engine through an associated inlet 52 of the fan casing 40. For the embodiment shown, the air flow 50 then passes through the fan rotor blades 44 and splits into a first compressed air flow (indicated by arrow 54) that moves through conduit 48 and a second compressed air flow (indicated by arrow 56) which enters the booster compressor 22. In the illustrated embodiment, the pressure of the second compressed air flow 56 is then increased and enters the high pressure compressor 24 (as indicated by arrow 58). After mixing with fuel and being combusted within the combustor 26, the combustion products 60 may exit the combustor 26 and flow through the first turbine 28. Thereafter, for the exemplary embodiment, the combustion products 60 flow through the second turbine 32 and exit the exhaust nozzle 36 to provide thrust for the gas turbine engine.

The apparatus 10 may also include a plurality of access ports 62 defined through its casings and/or frames for providing access to the interior of the apparatus 10, such as the core engine 14. For instance, as shown in FIG. 1, the gas turbine engine may include a plurality of access ports 62

(only eight of which are shown) defined through the outer casing 18 for providing internal access to one or both of the compressors 22, 24; for providing internal access to one or both of the turbines 28, 32; and/or for providing internal access to the combustor 26. In several embodiments, the access ports 62 may be spaced apart axially along the core engine 14. For instance, the access ports 62 may be spaced apart axially along each compressor 22, 24 and/or each turbine 28, 32 such that at least one access port 62 is located at each compressor stage and/or each turbine stage for providing access to the internal components located at such stage(s). In addition, the access ports 62 may also be spaced apart circumferentially around the core engine 14. For instance, a plurality of access ports 62 may be spaced apart circumferentially around each compressor stage and/or turbine stage.

It should be appreciated that, although the access ports 62 have been generally described herein with reference to providing internal access to one or both of the compressors 22, 24; to providing internal access to one or both of the turbines 28, 32; and/or to providing internal access to the combustor 26, the gas turbine engine may include access ports 62 providing access to any suitable internal location of the gas turbine engine.

Figure 2:
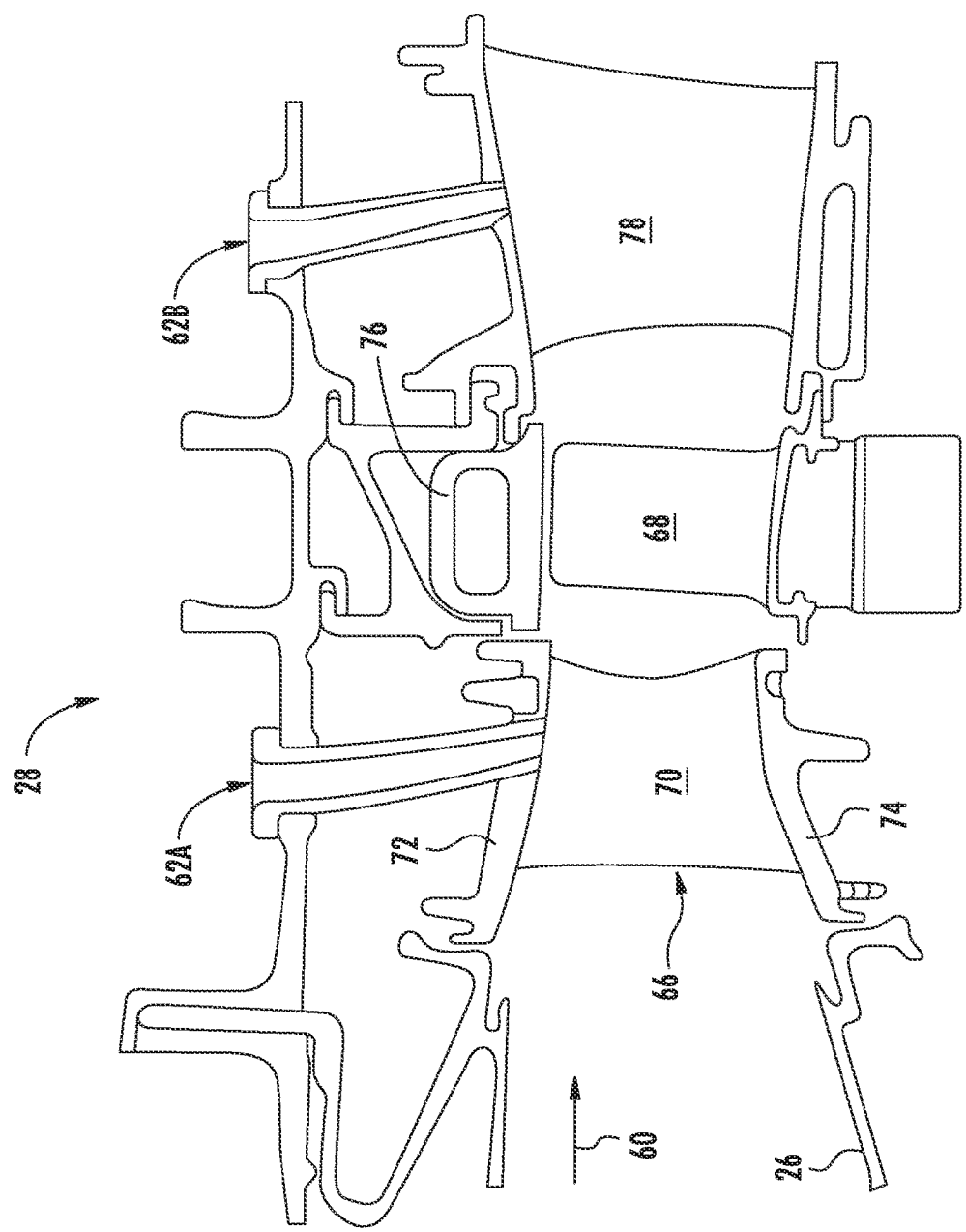
FIG. 2 illustrates a partial, cross-sectional view of a portion of the gas turbine engine shown in FIG. 1, particularly illustrating access ports defined in the engine for providing internal access.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 66 and an annular array of rotating turbine blades 68 (one of which is shown) located immediately downstream of the nozzle 66. The nozzle 66 may generally be defined by an annular flow channel that includes a plurality of radially-extending, circularly-spaced nozzle vanes 70 (one of which is shown). The nozzle vanes 70 may be supported between a number of arcuate outer bands 72 and arcuate inner bands 74. Additionally, the circumferentially spaced turbine blades 68 may generally be configured to extend radially outwardly from a rotor disk (not shown) that rotates about the centerline axis 12 (FIG. 1) of the gas turbine engine. Moreover, a turbine shroud 76 may be positioned immediately adjacent to the radially outer tips of the turbine blades 68 so as to define the outer radial flowpath boundary for the combustion products 60 flowing through the first turbine 28 along the hot gas path of the gas turbine engine.

As indicated above, the first turbine 28 may generally include any number of turbine stages, with each stage including an annular array of nozzle vanes 70 and follow-up turbine blades 68. For example, as shown in FIG. 2, an annular array of nozzle vanes 78 of a second stage of the first turbine 28 may be located immediately downstream of the turbine blades 68 of the first stage of the first turbine 28.

Moreover, as shown in FIG. 2, a plurality of access ports 62 may be defined through a turbine portion 19 of the outer casing 18 and/or frame (see FIG. 1), with each access port 62 being configured to provide access to the interior of the first turbine 28 at a different axial location. Specifically, as indicated above, the access ports 62 may, in several embodiments, be spaced apart axially such that each access port 62 is aligned with or otherwise provides interior access to a different stage of the first turbine 28. For instance, as shown in FIG. 2, a first access port 62A may be defined through the turbine portion 19 of the outer casing 18 and/or frame to provide access to the first stage of the first turbine 28 while a second access port 62B may be defined through the turbine portion 19 of the outer casing 18 and/or frame to provide access to the second stage of the first turbine 28.

It should be appreciated that similar access ports 62 may also be provided for any other stages of the first turbine 28 and/or for any turbine stages of the second (or low pressure) turbine 32. It should also be appreciated that, in addition to the axially spaced access ports 62 shown in FIG. 2, access ports 62 may also be provided at differing circumferentially spaced locations. For instance, in one embodiment, a plurality of circumferentially spaced access ports 62 may be defined through the turbine portion 19 of the outer casing 18 and/or frame at each turbine stage to provide interior access to the first turbine 28 at multiple circumferential locations around the turbine stage.

Figure 3:
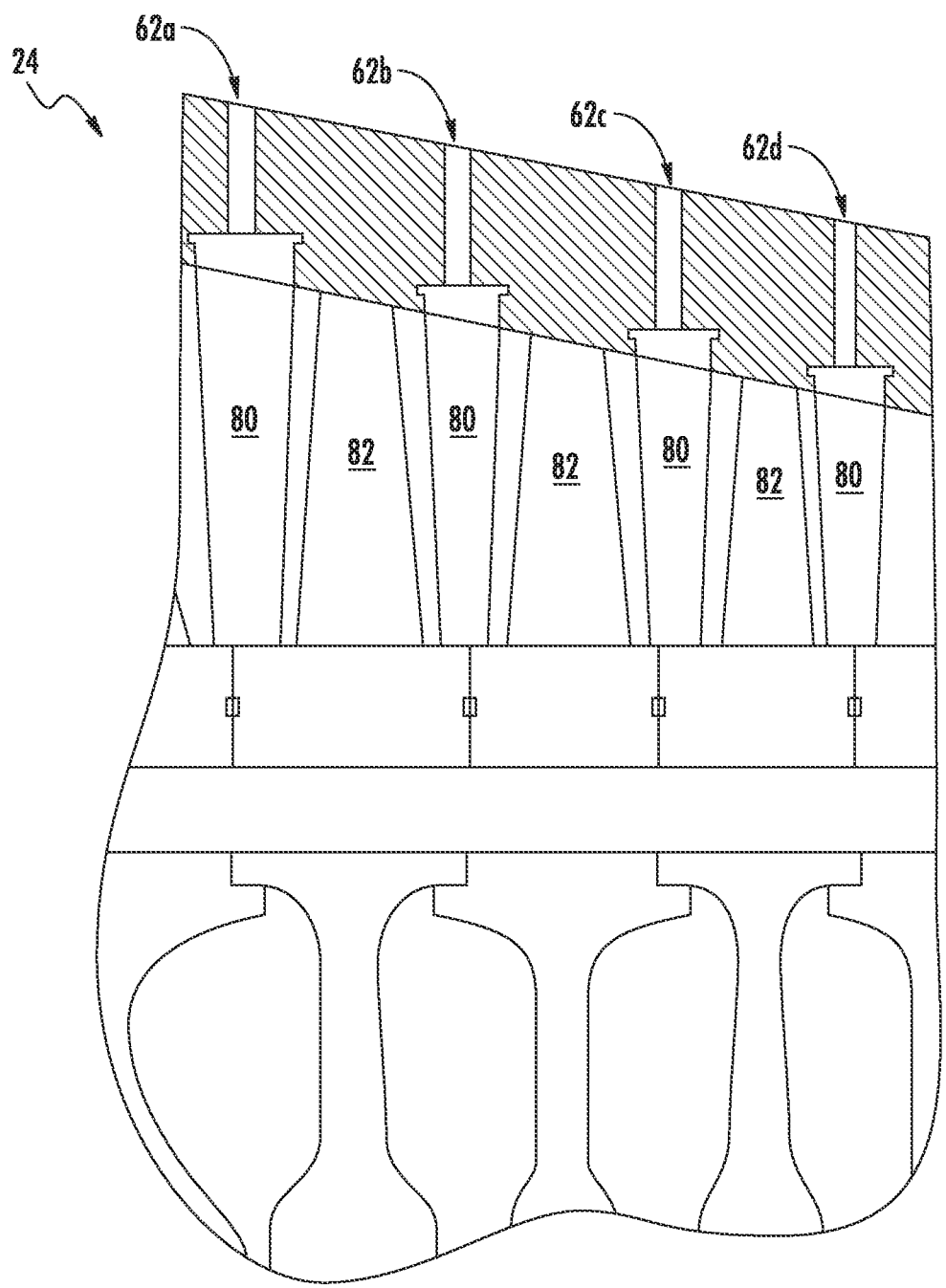
FIG. 3 illustrates a partial, cross-sectional view of one embodiment of a compressor suitable for use within the gas turbine engine shown in FIG. 1, particularly illustrating access ports defined in the engine for providing internal access to the compressor.

Referring now to FIG. 3, a partial, cross-sectional view of the high pressure compressor 24 described above with reference to FIG. 1 is illustrated in accordance with embodiments of the present subject matter. As shown, the high pressure compressor 24 may include a plurality of compressor stages, with each stage including both an annular array of fixed compressor vanes 80 (only one of which is shown for each stage) and an annular array of rotatable compressor blades 82 (only one of which is shown for each stage). Each row of compressor vanes 80 is generally configured to direct air flowing through the high pressure compressor 24 to the row of compressor blades 82 immediately downstream thereof.

Moreover, the high pressure compressor 24 may include a plurality of access ports 62 defined through a compressor portion 20 of the outer casing 18 and/or frame (see FIG. 1), with each access port 62 being configured to provide access to the interior of the high pressure compressor 24 at a different axial location. Specifically, in several embodiments, the access ports 62 may be spaced apart axially such that each access port 62 is aligned with or otherwise provides interior access to a different stage of the high pressure compressor 24. For instance, as shown in FIG. 3, first, second, third and fourth access ports 62a, 62b, 62c, 62d are illustrated that provide access to four successive stages, respectively, of the high pressure compressor 24.

It should be appreciated that similar access ports 62 may also be provided for any of the other stages of the high pressure compressor 24 and/or for any of the stages of the booster compressor 22. It should also be appreciated that, in addition to the axially spaced access ports 62 shown in FIG. 3, access ports 62 may be also provided at differing circumferentially spaced locations. For instance, in one embodiment, a plurality of circumferentially spaced access ports 62 may be defined through the compressor portion 20 of the outer casing 18 and/or frame at each compressor stage to provide interior access to the high pressure compressor 24 or the booster compressor 22 at multiple circumferential locations around the compressor stage.

Referring generally to FIGS. 4-11, various views of embodiments of a system 200 for inserting and orienting a soft robotic probe 100 into the apparatus 10 and capturing images 206 (see FIG. 13) is illustrated in accordance with aspects of the present subject matter. As shown, the system includes a cable 111, an actuation assembly 115, and a camera 122. The cable includes an adjustable sheath 113 at the exterior of the cable 111. The adjustable sheath 113 is defined around a probe centerline 114 that extends the length of the probe 100. As such, the adjustable sheath 113 extends and contracts the cable 111 between a first length 105 and a second length 107. More specifically, the second length 107 is different from the first length 105. Further, the actuation assembly 115 is defined within the adjustable sheath 113. The actuation assembly 115 extends or contracts the cable 111 between the first length 105 and the second length 107.

Additionally, the actuation assembly 115 adjusts an orientation of the cable 111, an orientation of a tip 104 of the probe 100, or both along at least one axis. The camera 122 is located at the tip 104 of the probe 100. Further, the camera 122 captures images at least partially around a circumferential direction relative to a camera centerline 135. In one embodiment, the system 200 includes a stiffening device 119. For example, the stiffening device 119 may extend the length of the cable 111 and is housed within the adjustable sheath 113. Further, the stiffening device 119 provides rigidity to the cable 111.

Figure 11:
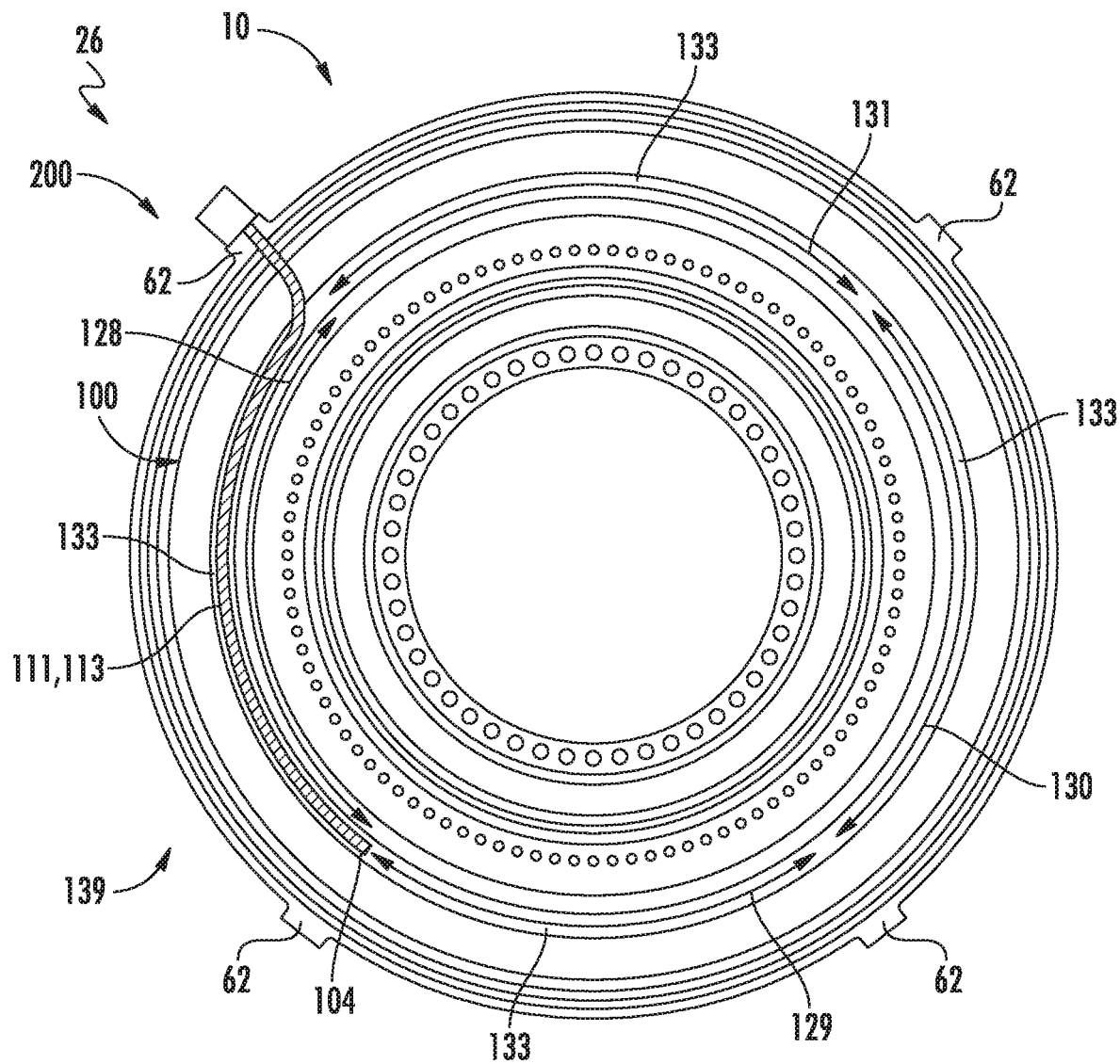
FIG. 11 illustrates a probe according to aspects of the present subject matter inserted into a combustor through an access port.

In certain embodiments, the system 200 may include a computer 202 communicatively coupled to the probe 100. Further, the computer 202 guides the probe 100 on a predetermined path 139 (as shown in FIG. 11) through the apparatus 10 and capture images 206 at regular intervals. The computer 202 combines images 206 captured at the regular intervals into a single composite image 216 of the apparatus 10 along the predetermined path 139.

Figure 4:
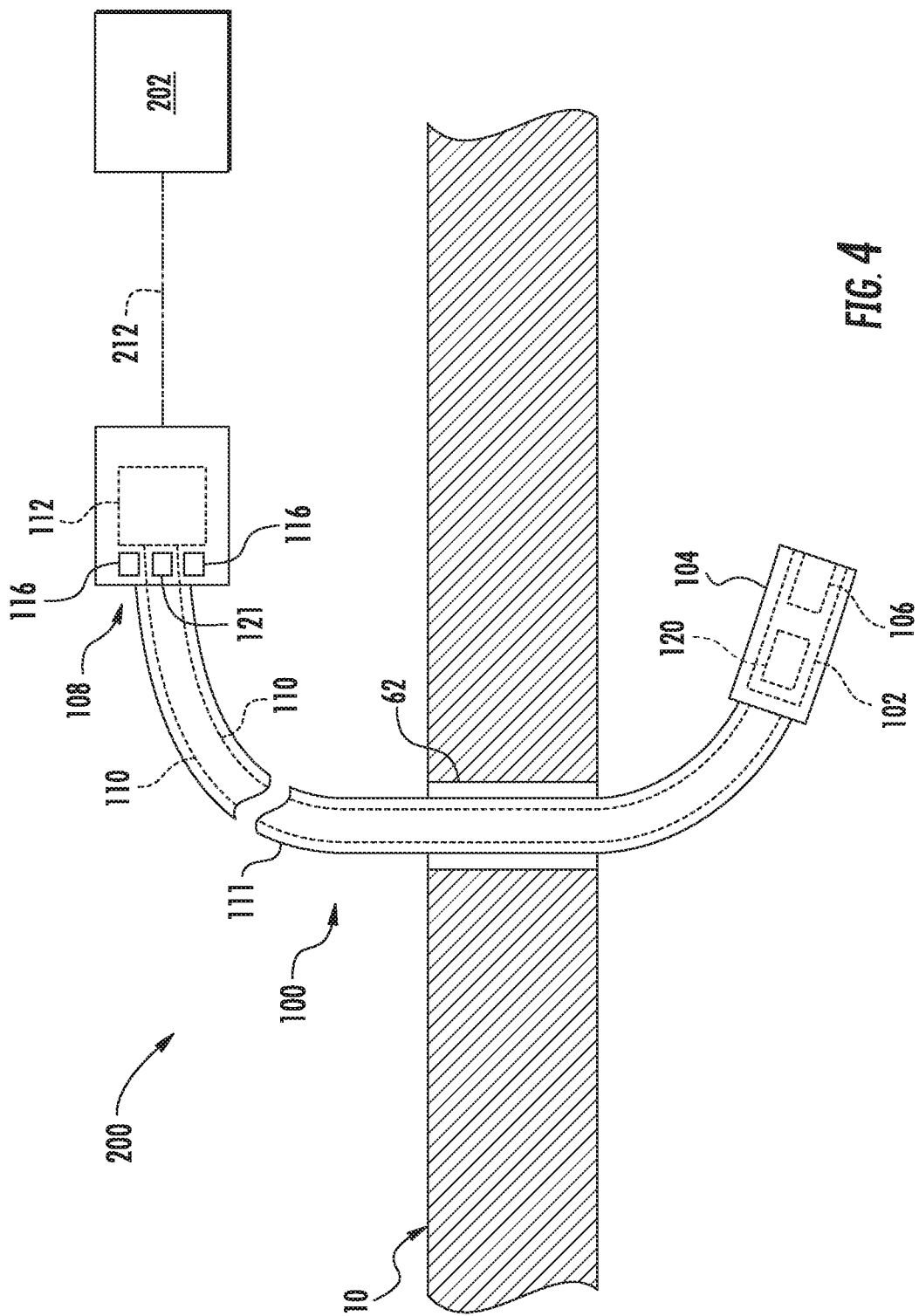
FIG. 4 illustrates a view of one embodiment of a probe that may be used in accordance with aspects of the present subject matter to visually inspect a gas turbine engine and a system for generating composite images.

Referring now particularly to FIG. 4, as shown, the probe 100 has been inserted through an access port 62 of the apparatus 10, such as any of the access ports 62 described above with reference to the gas turbine engine of FIGS. 1-3. The system 200 may include the probe 100 and a computer 202 communicatively coupled to the probe 100. For the illustrated embodiment, the probe 100 includes at least one sensor 120 and a cable 111. For the exemplary embodiment, the sensor 120 produces a signal that is communicated through the cable 111 and to the computer 202 via the communicative cable 212. In the shown embodiment, the computer 202 is configured to orient and feed the probe 100 while it is inserted and oriented into the apparatus 10. For example, the computer 202 may send signals via the communicative cable 212 to the probe 100 to change the orientation of the probe 100. It should be recognized that in other embodiments the signals communicated to and from the computer 202 and probe 100 may be communicated wirelessly. Further, the term "communicate," and variation thereof, as used herein, refers to direct communication and indirect communication such as through a memory system or another intermediary system.

In general, the probe 100 may correspond to any suitable probe configured to be inserted within the apparatus 10 via an access port 62. For example, as shown in the illustrated embodiment, the probe 100 corresponds to an optical probe 100. In such an embodiment, the optical probe 100 corresponds to any suitable optical device that may be inserted through an access port 62 of the apparatus 10 to allow images 206 (e.g., FIG. 13) of the interior of the apparatus 10 to be captured or otherwise obtained. For instance, in several embodiments, the optical probe 100 may correspond to a borescope, videoscope, fiberscope, or any other similar optical device known in the art that allows for the interior of an apparatus 10 to be viewed through an access port 62. In other embodiments, the probe 100 may be a repair probe, a range finder, a laser rangefinder, a proximity probe, a LIDAR probe, a RADAR probe, or any other suitable probe for insertion into the internal structure of an apparatus 10.

In such embodiments, a sensor housing 102 may include one or more optical elements, such as one or more optical lenses, optical fibers, image capture devices (e.g., video cameras, still-image cameras, CCD devices, CMOS devices), cables, and/or the like, for obtaining views or images of the interior of the apparatus 10 at a tip 104 of the probe 100 and for transmitting or relaying such images 206 (see e.g., FIG. 13) from the probe tip 104 along the length of the probe 100 to the exterior of the apparatus 10. As such, the sensor housing 102 may include a sensor 120 such as an optical sensor. For instance, as shown in FIG. 4, the interior views or images 206 obtained by the probe 100 may be transmitted from the probe tip 104 to the computer 202 connected or otherwise coupled to the probe 100 via communicative cable 212. Additionally, as shown in FIG. 4, in one embodiment, a light source 106, such as an LED, may be provided at or adjacent to the probe tip 104 to provide lighting within the interior of the apparatus 10.

In one embodiment, the probe 100 may further include at least one other sensor 120. As such, for the illustrated embodiment, the signal from the sensor(s) 120 is transmitted to the computer 202 and may be used by the computer 202 to determine the real-time location of the probe 100 and/or for inspection purposes. For example, in one embodiment, at least one sensor 120 may include a proximity sensor. Proximity sensors may include, generally, sensors that at least emit or retrieve electromagnetic signals and process changes in said electromagnetic signals. For example, proximity sensors may include, but are not limited to, capacitive, infrared, inductive, magnetic, sonic or ultrasonic proximity sensors, LIDAR, RADAR, or laser rangefinders.

The probe 100 may also include an articulation assembly 108 that allows the orientation of the probe tip 104 to be adjusted within the interior of the apparatus 10. For example, the articulation assembly 108 may allow for the probe tip 104 to be rotated or pivoted about a single axis or multiples axes to adjust the orientation of the tip 104 relative to the remainder of the probe 100. It should be appreciated that the articulation assembly 108 may generally have any suitable configuration and/or may include any suitable components that allow for adjustment of the orientation of the probe tip 104 relative to the remainder of the probe 100. For example, in one embodiment, a plurality of articulation cables 110 may be coupled between the probe tip 104 and one or more articulation motors 112. In such an embodiment, by adjusting the tension of the articulation cables 110 via the articulation motor(s) 112, the probe tip 104 may be reoriented within the apparatus 10.

It should also be appreciated that, in several embodiments, the articulation assembly 108 may be configured to be electronically controlled. Specifically, as shown in FIG. 4, the computer 202 may be communicatively coupled to the articulation assembly 108 to allow the computer 202 to adjust the orientation of the probe tip 104 via control of the articulation assembly 108. For instance, in the illustrated embodiment, the computer 202 may be configured to transmit suitable control signals to the articulation motor(s) 112 in order to adjust the tension within the associated articulation cable(s) 110, thereby allowing the computer 202 to automatically adjust the orientation of the probe tip 104 within the apparatus 10.

It should be appreciated that, in other embodiments, the probe 100 may correspond to any other suitable probe configured to be inserted within the apparatus 10 via one of its access ports 62. For instance, in an alternative embodiment, the probe 100 may correspond to a repair probe configured to be inserted within the apparatus 10 to allow a repair procedure to be performed on one or more of the internal engine components, such as a probe 100 used to repair cracks and/or other damage within the engine.

Figure 5:
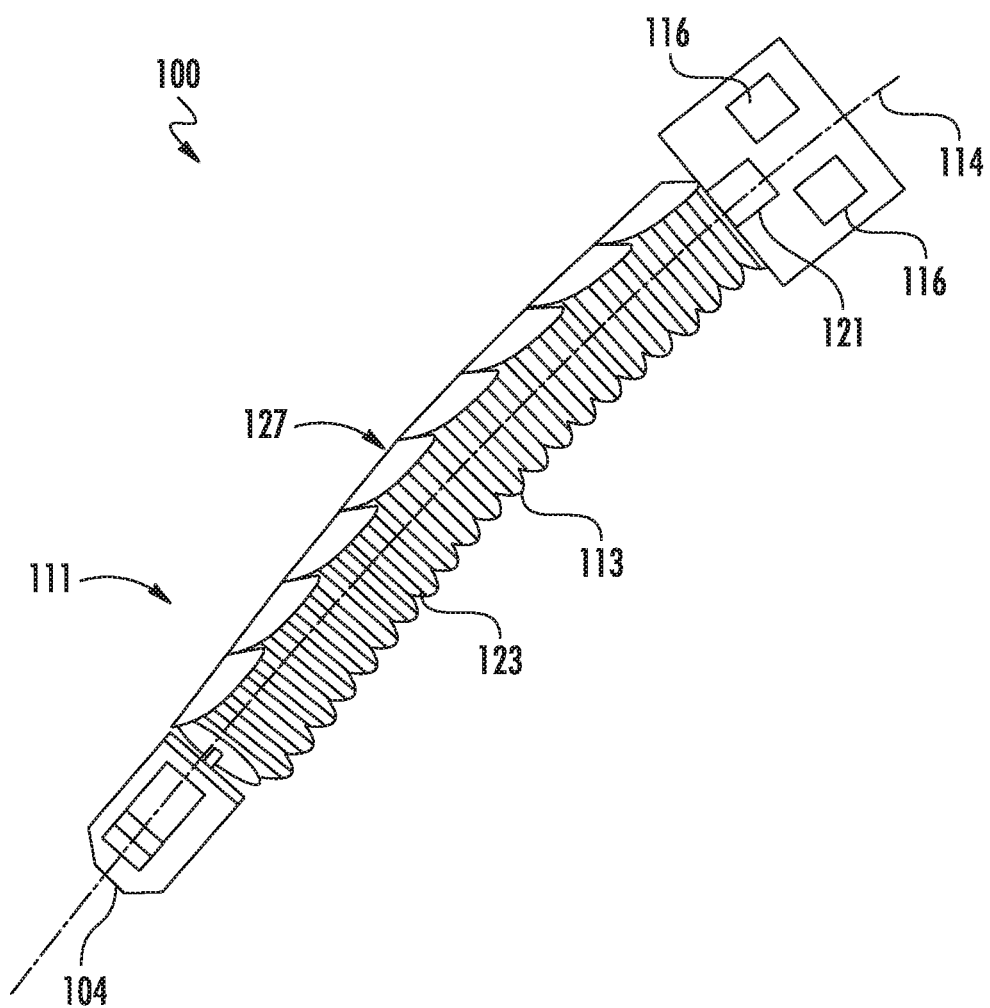
FIG. 5 illustrates a view of one embodiment of a probe with a soft robotic cable that may be used in accordance with aspects of the present subject matter.

Referring now to FIG. 5, a view of a probe 100 and the cable 111 according to the present disclosure is illustrated. For the exemplary embodiment shown, the cable 111 includes an adjustable sheath 113. For example, the adjustable sheath 113 may be defined around a probe centerline 114 extending the length of the probe 100.

Figure 6A:
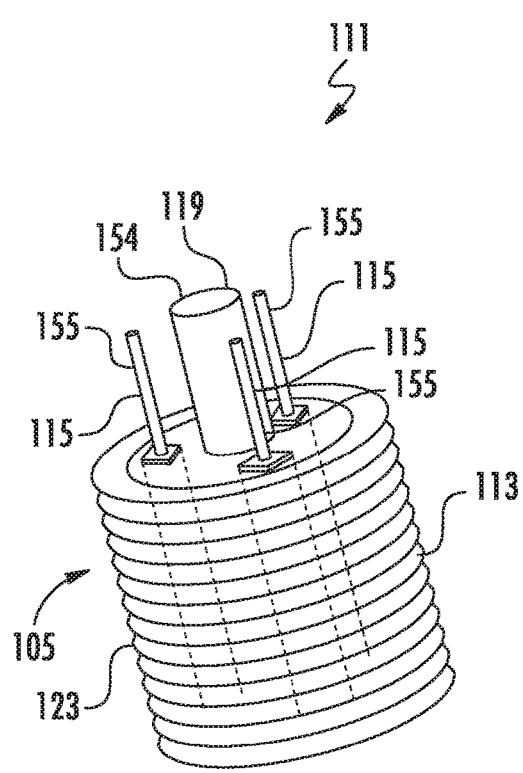
FIG. 6A illustrates the internal structure of the soft robotic cable of FIG. 5 at a first length.
Figure 6B:
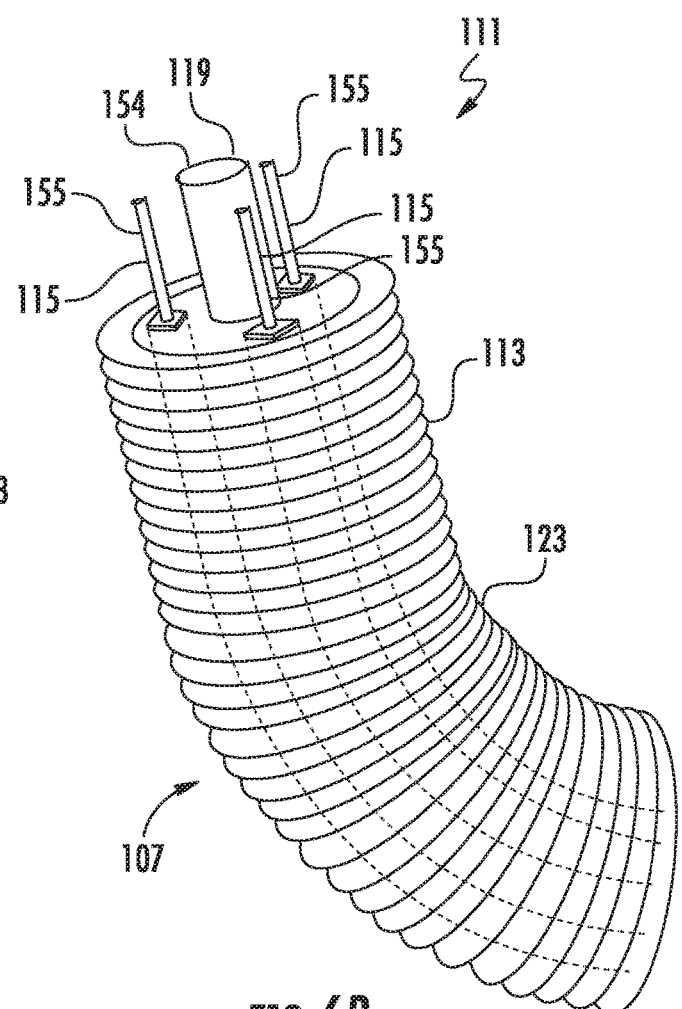
FIG. 6B illustrates the internal structure of the soft robotic cable of FIG. 5 at a second length.

Referring now to FIGS. 6A and 6B, FIG. 6A illustrates an exemplary embodiment of cable 111 in at a first length 105, and FIG. 6B. illustrates an exemplary embodiment of the cable 111 at a second length 107. For the depicted embodiment, the adjustable sheath 113 extends and contracts between a first length 105 and the second length 107. For instance, the first length 105 may correspond to an unextended length. Similarly, the second length 107 may correspond to an extended length. Such that, the second length 107 may be different than the first length 105. Moreover, the adjustable sheath 113 may extend or contract to any length between the first length 105 and the second length 107. In one embodiment, the adjustable sheath 113 is a crimped braided sheath. As such, the crimped braided sheath may include small folds 123 in the unextended length. For the illustrated embodiment, when the crimped braided sheath is extended, the folds 123 at least partially straighten out and allow the adjustable sheath 113 to extend further than an uncrimped sheath. For example, the adjustable sheath 113 may be expandable such that the second length 107 is approximately five times longer or more than the first length 105. Further, in some embodiments, the adjustable sheath 113 may be formed from soft polymers and/or composite variations of polymers. For example, the adjustable sheath 113 may be formed from a liquid-solid silicone and gallium composite. In certain embodiments, the composite variations of polymers may help to provide rigidity to the adjustable sheath 113 and/or the cable 111.

Figure 7:
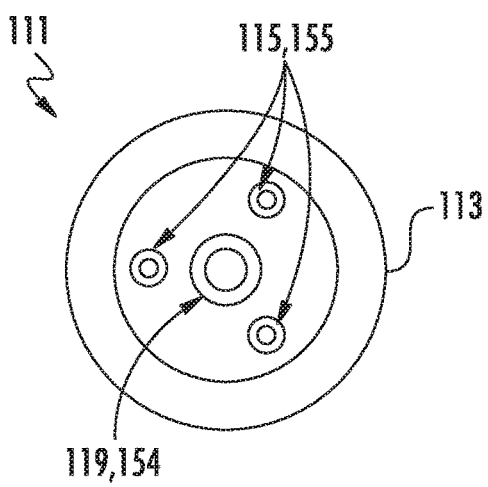
FIG. 7 illustrates a partial, cross-sectional view of the soft robotic cable of FIG. 5.

Referring now to FIGS. 6 and 7, views of the interior of the cable 111 are shown. FIG. 7 illustrates a cross-sectional view of the cable 111 according to the present disclosure. For the depicted embodiment, the probe 100 includes an actuation assembly 115 enclosed within and defined by the adjustable sheath 113. Further, in the illustrated embodiment, the actuation assembly 115 extends or contracts the adjustable sheath 113 and, therefore, the cable 111 between the first length 105 and the second length 107. For example, one or more of the actuation assemblies 115 can extend the adjustable sheath 113 between the first length 105, such as the length of the segments shown in FIG. 6A, to the second length 107, such as the length of the segment shown in FIG. 6B. Further, the adjustable sheath 113 may be a crimped braided sheath, as shown in FIGS. 6A and 6B, which may allow the cable 111 to both extend and contract. As such, the actuation assembly 115 may be used to set the adjustable sheath 113 to any length between the first length 105 and the second length 107.

Further, for the depicted embodiment, the actuation assembly 115 adjusts an orientation of the cable 111, an orientation of the probe tip 104, or both along at least one axis. For example, the actuation assembly 115 may be activated to steer or direct the probe 100 or probe tip 104 in a desired direction. The actuation assembly 115 may be used in addition to or in lieu of the articulation assembly 108 to adjust the orientation of the probe tip 104. In certain embodiments, as shown in FIGS. 6 and 7, the probe 100 may include a plurality of actuation assemblies 115, such as two or more. As such, the plurality of actuation assemblies 115 may allow for the manipulation of the probe tip 104 or the probe 100 along more than one axis. Such multi-axis manipulation may be used to steer or direct the probe 100 in any desired direction. For example, for the embodiment shown in FIG. 6B, the cable 111 bends in a circular fashion under direction of the actuation assembly 115 when the cable 111 and adjustable sheath 113 are in the extended position.

In some embodiments, the actuation assemblies 115 may be actuators extending the length of the adjustable sheath 113. Further, the actuators may be actuation cylinders such as fluidic chambers 155. For example, the fluidic chamber 155 may be a chamber filled with a fluid such as air, water, oil, or a similar substance. As such, the fluidic chamber 155 may expand and increase in length when exposed to increasing pressure. Likewise, the fluidic chamber 155 may contract and decrease in length when exposed to a decrease in pressure. The adjustable length of the fluidic chambers 155 may manipulate the length of the adjustable sheath 113, adjust the orientation of the cable 111 or probe tip 104, or both. Further, the actuators may be electronically controlled to adjust the length of the adjustable sheath 113, the orientation of the cable 111, the probe tip 104, or any combination of the preceding. It should be recognized that, in other embodiments, the fluidic chambers 155 may be any shape, such as, but not limited to, circular, oval, rectangular, polygonal, or a combination of the preceding.

The system 200 may include an actuation source 116 (as seen in FIGS. 4 and 5) coupled to the actuation assembly 115. As such, the actuation source 116 may elongate or shorten the actuation assembly 115. For example, the actuation source 116 may receive a signal from the computer 202 to change a length of the actuation assembly 115. Further, the actuation source 116 may shorten or lengthen the actuation assembly 115 by providing a change in pressure, temperature, electrical current, or voltage to the actuation assembly 115. One of ordinary skill in the art will realize that the actuation source 116 may change the length of the actuation assembly 115 by providing any changing input known in the art.

Figure 8:
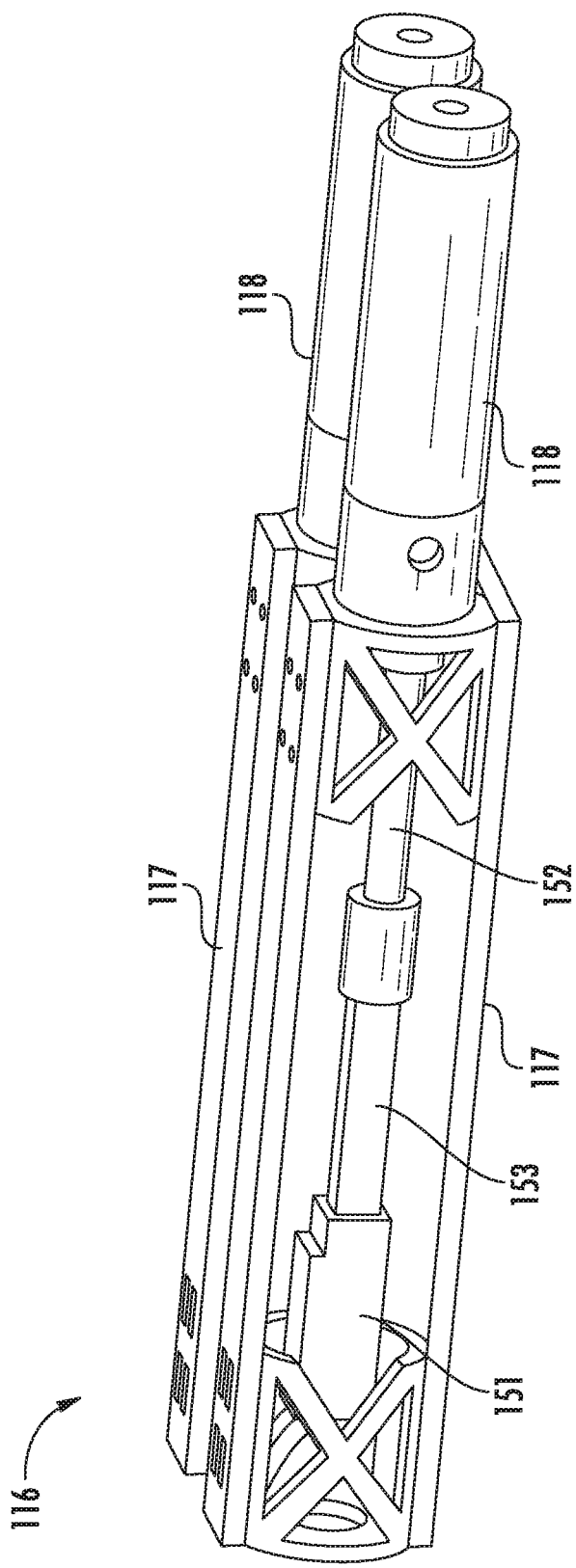
FIG. 8 illustrates a view of an actuation source that may be used in accordance with aspects of the present subject matter to expand, contract, or manipulate a soft robotic probe.

Referring now to FIG. 8, an embodiment of an actuation source 116 is illustrated according to the present disclosure. In the embodiment shown, the actuation source 116 of FIG. 8 is a fluidic drive cylinder. The fluidic drive cylinder may be coupled to the actuation assemblies 115, such as fluidic chambers 155, in order to change the length of the adjustable sheath 113 or to adjust an orientation of the cable 111, the probe tip 104, or both. The fluidic drive cylinder may include electric linear actuators 117 and fluidic cylinders 118. In the illustrated embodiment, the electric linear actuator 117 includes a motor 151 and a mechanical piston 153. As such, the motor 151 may extend or retract the mechanical piston 153 along the length of the electrical linear actuator 117. Further, the mechanical piston 153 may be coupled to a shaft 152 extending into the fluidic cylinder 118. In the illustrated embodiment, the shaft 152 reduces the volume of the fluidic cylinder 118 when extended by the motor 151 via the mechanical piston 153. Further, the shaft 152 may increase the volume of the fluidic cylinder 118 when extracted by the motor 151 via the mechanical piston 153.

The fluidic cylinders 118 may be coupled to the fluidic chambers 155 in order to provide a changing pressure. For example, the fluidic drive cylinder may receive a signal from the computer 202 via communicative cable 212 to extend or contract the adjustable sheath 113 or change an orientation of the probe 100 or probe tip 104. As such, the electronic linear actuators 117 may displace the shafts 152 via the mechanical pistons 153. For instance, moving the shafts 152 in or out of the fluidic cylinders 118 may create a volumetric variation. For the depicted embodiment, such volumetric variation within the fluidic cylinders 118 creates a pressure change in the fluidic cylinders 118 that is communicated and transferred to the fluidic chambers 155 coupled to the fluidic cylinders 118.

It should be recognized that a pressure change may be provided to the fluidic chambers 155 via any other pressure source, such as, but not limited to, a compressor. Moreover, the actuation assembly 115 may be activated by any change in a property of the actuation source 116. For example, the actuation source 116 may also provide a change in one or more of, but not limited to, pressure, temperature, electrical current, or voltage to the actuation assembly 115.

Referring again to FIGS. 6 and 7, the probe 100 may include a stiffening device 119. In some embodiments, the desired expansion ratio of the cable 111 may not be achievable while maintaining the desired stiffness in the cable 111. As such, the stiffening device 119 may provide additional rigidity. In the illustrated embodiment, the stiffening device 119 extends the length of the cable 111 and is housed and defined within the adjustable sheath 113. In the exemplary embodiment, the stiffening device 119 selectively provides rigidity to the adjustable sheath 113. Further, the stiffening device 119 may be used in conjunction with the actuation assembly 115 to control and guide the probe 100, the probe tip 104, or both. In certain embodiments, the stiffening device 119 may define a chamber 154 that provides rigidity when provided with a negative pressure source. In certain embodiments, the chamber 154 may also extend the length of the stiffening device 119.

For instance, as shown in FIGS. 4-7, the probe may include a stiffening source 121 coupled to the stiffening device 119 to provide rigidity to the adjustable sheath 113 and therefore the cable 111. For example, the stiffening source 121 may receive a signal from the computer 202 to provide rigidity to the cable 111. As such, the stiffening source 121 may provide a negative pressure to the chamber coupled to the stiffening source 121. For example, the chamber 154 may be filled with sand. As such, the chamber 154 filled with sand may be flexible while under atmospheric pressure. Further, when the chamber 154 is exposed to a vacuum or negative pressure, the sand in the chamber 154 may become compact and provide rigidity to the stiffening device 119 and therefore the cable 111.

In certain embodiments, the stiffening source 121 is a fluidic drive cylinder of FIG. 8 provides a decrease in pressure. In other embodiments, the stiffening source 121 may provide a negative pressure or vacuum through any method known in the art, such as, but not limited to, a vacuum pump. Moreover, the stiffening device 119 may be activated by any change in a property of the stiffening source 121. For example, the stiffening source 121 may also provide a change in any one of, but not limited to, pressure, temperature, electrical current, or voltage to the stiffening device 119.

Referring now to FIG. 5, the probe may include a plurality of slidable segments 127 defined within the adjustable sheath 113 and extending along the length of the cable 111. In one exemplary embodiment, the slidable segments 127 provide additional rigidity to the cable 111. For example, the slidable segments 127 may be loose when the adjustable sheath 113 and actuation assemblies 115 are in a contracted position. Whereas, when actuation assemblies 115 and adjustable sheath 113 are extended, the slidable segments 127 may lock together to provide rigidity to the cable 111. Further, the slidable segments 127 may be oriented and sized to configure the cable 111 into a fixed shape, such as to follow the predetermined path 139.

Figure 9:
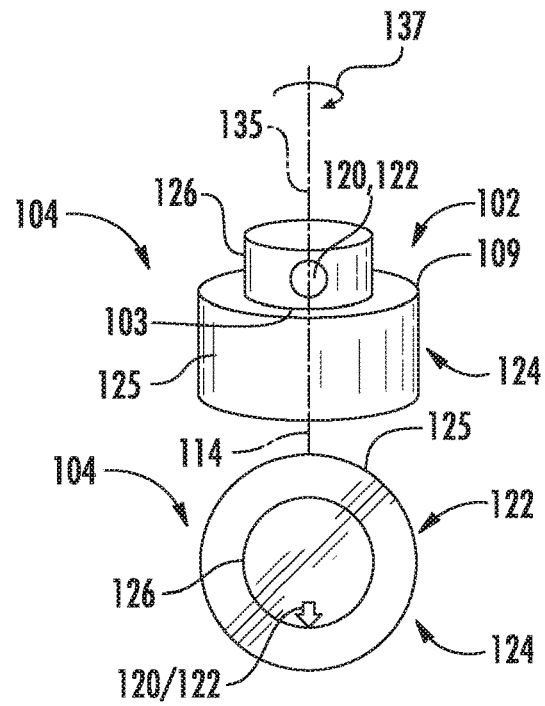
FIG. 9 illustrates views of a camera that may be used in accordance with aspects of the present subject matter to capture images.
Figure 10:
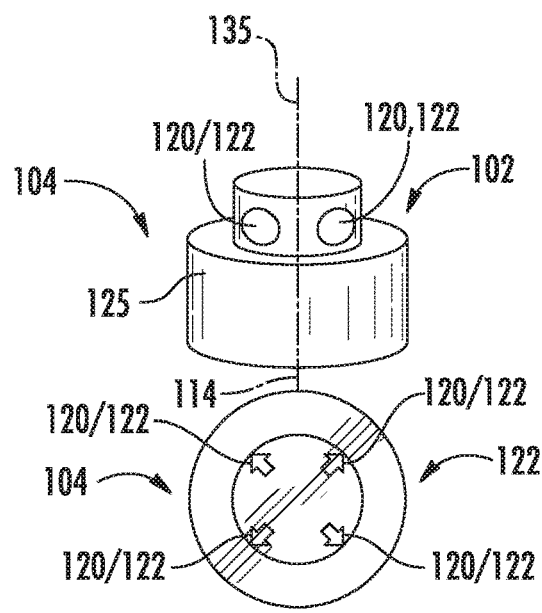
FIG. 10 illustrates views of another embodiment of a camera that may be used in accordance with aspects of the present subject matter to capture images.

Referring now to FIGS. 9 and 10, views of a camera 122 at the probe tip 104 are illustrated according to aspects of the present disclosure. FIG. 9 shows a probe 100 including a sensor housing 102 with a single camera 122, and FIG. 10 shows a probe 100 including a sensor housing 102 with a plurality of cameras 122. For the depicted embodiment, the probe 100 includes at least one sensor 120 at the probe tip 104. In the illustrated embodiments, the probe 100 includes an optical sensor at the probe tip 104 such as the camera 122. Further, in the embodiment shown, the camera 122 includes a camera centerline 135 defined by the center of the sensor housing 102. As such the camera centerline 135 may be coaxial with the probe centerline 114, may be at an acute angle to the probe centerline 114, may be at an oblique angle to the probe centerline 114, or may be parallel to the probe centerline 114. In the exemplary embodiment, the camera 122 captures images radially from camera centerline 135.

Further, for the embodiment illustrated, the camera(s) 122 captures images 206 (see e.g., FIG. 13) at least partially around a circumferential direction relative to the camera centerline 135, as shown by an arrow 137 in FIG. 9. As such, the camera 122 may be rotates between a first position 103 and a second position 109 along the circumferential direction. It should be recognized that the first position 103 and second position 109 may be located at any position along the circumferential direction. For instance, the camera may rotate to and from any position along the circumferential direction. For example, the camera 122 may include a slip ring 124 allowing a rotor portion 126 of the camera 122 to rotate relative to a stator portion 125 of the slip ring 124. It should be recognized that the slip ring 124 may be integrated into the camera 122 or may be a separate device coupling the camera 122 to the cable 111, the probe tip 104, or both. Further, the camera 122 may rotate continuously or intermittently around the entire circumference of the sensor housing 102 relative to the camera centerline 135 in one direction or either direction. The camera 122 may capture images 206 and send the images 206 through the cable 111 and to the computer 202 via the communicative cable 212.

Referring particularly to FIG. 10, the sensor housing 102 may include a plurality of cameras 122. For example, the cameras 122 may be oriented in different directions along the circumferential direction defined around the camera centerline 135. As shown in the embodiment of FIG. 10, the cameras 122 may generally be spaced evenly around the circumference of the sensor housing 102. In other embodiments, the cameras 122 may not be spaced evenly around the circumference of the sensor housing 102. As such, each of the plurality of cameras 122 may capture an unequal portion along the circumference of the sensor housing 102. Further, in other embodiments, the camera(s) 122 and/or sensor housing 102 may be placed off of the probe centerline 114. For instance, the camera centerline 135 may be a distance away from the probe centerline 114 or at an angle thereto.

Referring now to FIG. 11, the probe 100 has been inserted through an access port 62 of an exemplary embodiment of the apparatus 10. For the embodiment depicted, the probe 100 has been inserted through an access port 62 of the combustor 26 of FIG. 1. It should be recognized that the probe 100 may be inserted through any access port 62 of the apparatus 10, such as any of the access ports 62 described above with reference to FIGS. 1-3. For the illustrated embodiment, the probe 100 has been inserted into the combustor 26 in order to form an inspection, such as a visual inspection. In general, the probe 100 may be inserted through any access port 62 of any apparatus 10.

The apparatus 10 may include segments 128, 129, 130, 131 between access ports 62. Further, for the illustrated embodiment, the probe is guided through at least one of the segments 128, 129, 130, 131 under direction of the computer 202. For example, the probe receives a signal to actuate the one or more actuation assemblies 115, the stiffening device(s) 119, or a combination of the two. In some embodiments, the orientation of the probe tip 104 may be manipulated under guidance of the computer 202 using the articulation assembly 108. In the exemplary embodiment, at least one of the segments 128, 129, 130, 131 defines the predetermined path 139 for the probe 100 to follow under guidance of the computer 202. For instance, the predetermined path 139 may include one of the segments 128, 129, 130, 131; a combination of the segments 128, 129, 130, 131; or all of the segments 128, 129, 130, 131. As such, in certain embodiments, the predetermined path 139 includes a path defined by the entire circumference of the apparatus 10, such as the combustor 26. In a further embodiment, slidable segments 127 (as shown in FIG. 5) may define the predetermined path 139 when the slidable segments 127 are extended to provide rigidity to the cable 111.

Still referring to FIG. 11, the probe 100 may be halted at predetermined locations 133 along the predetermined path 139 to capture images 206 (see e.g., FIG. 13), such as with the camera(s) 122. It should be recognized that any number of predetermined locations 133 may be located along the predetermined path 139. For instance, the camera(s) 122 may capture images 206 radially from the probe tip 104 of the probe 100. For example, the camera(s) 122 may capture images 206 that together show views of the apparatus 10, such as the combustor 26, at least partially around the circumference of the probe 100. In one embodiment, the slip ring 124 rotates one camera(s) 122 to capture images 206 at different locations around the circumference of the sensor housing 102. In embodiments where the sensor housing 102 includes multiple cameras 122, each camera 122 may capture images 206 at a different location around the circumference of the sensor housing 102. For example, in certain embodiments, the images 206 captured by the camera(s) 122 at the predetermined location 133 may capture the entirety of the internal structure of the apparatus 10 along the predetermined path 139. In another embodiment, the camera(s) 122 may capture images 206 continuously along the predetermined path 139. Still in a further embodiment, the camera(s) 122 may capture images 206 of a first portion of the apparatus 10 while being inserted down the predetermined path 139. When the probe 100 has reached the end of the predetermined path 139, the camera(s) 122 may be rotated (such as with the slip ring 124). The probe 100 may then be withdrawn along the predetermined path 139 while the camera(s) 122 captures views of a second portion of the apparatus 10. Further, in another embodiment, the camera 122 may be rotated while being inserted, while being withdrawn, or both and capture images 206 along the predetermined path 139.

Figure 12:
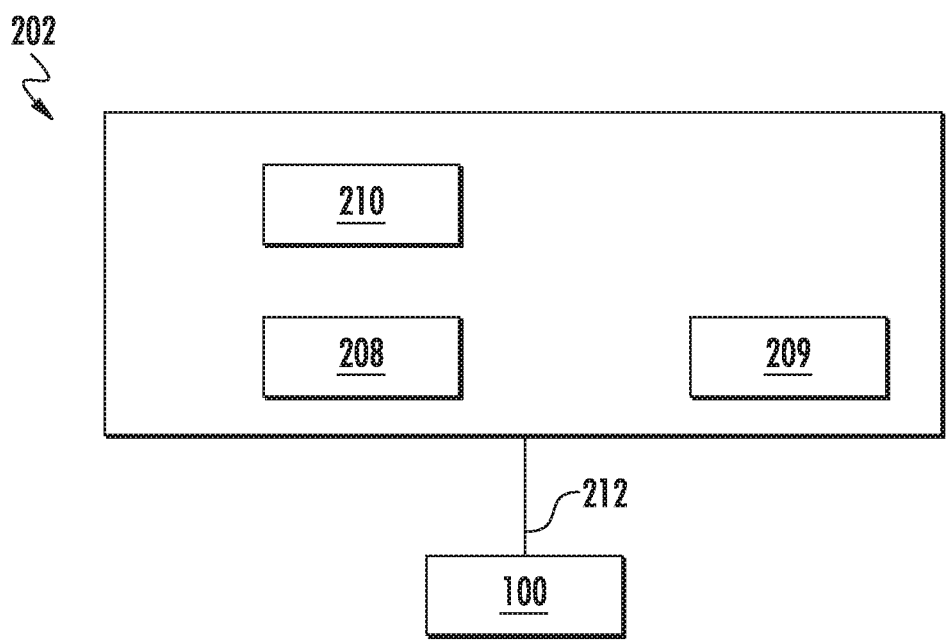
FIG. 12 illustrates one embodiment of a computer configured to control a soft robotic probe and process images in accordance with aspects of the present subject matter.
Figure 13:
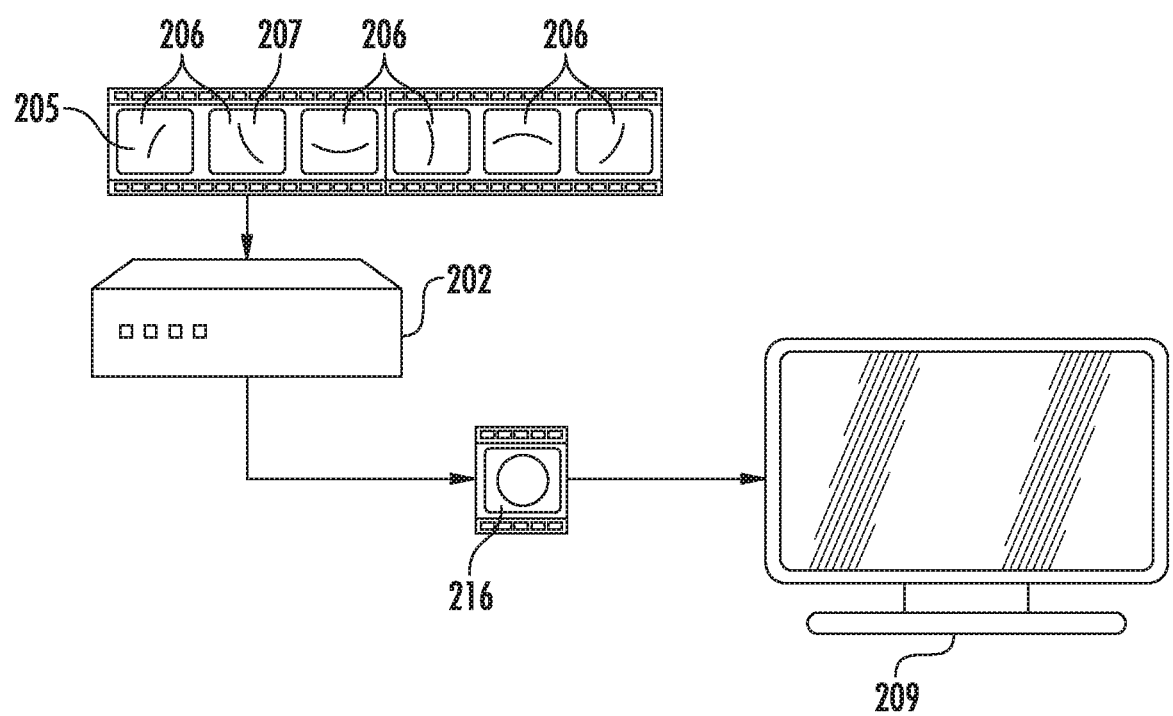
FIG. 13 illustrates another embodiment of the computer of FIG. 12 configured to produce a composite image in accordance with aspects of the present subject matter.

Referring now to FIG. 12, a block diagram of the computer 202 according to the present disclosure is illustrated. In general, the computer 202 may correspond to any suitable processor-based device and/or any suitable combination of processor-based devices. The computer 202 may be communicatively coupled to the probe 100 via communicative cable 212 or via wireless communication. Thus, in several embodiments, the computer 202 may include one or more processor(s) 208 and associated memory device(s) 210 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and/or other programmable circuits. Furthermore, the computer 202 may include a display 209 for displaying captured images 206 or composite images 216 (as shown in FIG. 13).

Additionally, the memory device(s) 210 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory device(s) 210 may generally be configured to store suitable computer-readable instructions that, when implemented by the processor(s) 208, configure the computer 202 to perform various functions including, but not limited to, determining the current location of the probe tip 104 within the apparatus 10 based at least in part on the signals received from the sensors 120, sending signals to the camera(s) 122 to capture images 206, sending signals to the actuation assemblies 115 to extend or contract the adjustable sheath 113, sending signals to the actuation assemblies 115 to adjust the orientation of the probe 100 or probe tip 104, sending signals to the stiffening device 119 to provide rigidity to the cable 111, receiving images from the camera(s) 122 and combining images 206 to form a composite image 216, and/or sending signals to the articulation assembly 108 to adjust the orientation of the probe tip 104.

For example, computer 202 can receive a signal from the probe 100, attempt to comprehend the surrounding environment by performing various processing techniques on data collected by the sensor 120, determine the location of the probe tip 104 along the predetermined path 139, and generate an appropriate motion plan to continue along the predetermined path 139. For example, the computer 202 may be configured to guide the probe 100 on a predefined path through the apparatus 10 and capture images 206 at regular intervals. As such, the signal from the probe may be the images 206 captured by the camera(s) 122. In another embodiment, the probe tip 104 may include a sensor 120, such as a 3D position sensor and/or accelerometer, which may determine the location of the probe tip 104. The computer 202 may send signals to orient and feed the probe 100 along the predetermined path 139 through the apparatus 10.

In some embodiments, the memory device 210 may include an algorithm that learns the most efficient method of moving the probe 100 along the predetermined path 139, by storing and processing data from multiple insertions along the same or similar predetermined paths 139, e.g., machine learning. For example, the machine-learned model can be or can otherwise include one or more various machine or statistical learning model(s) such as, for example, neural networks (e.g., deep neural networks), support vector machines, linear discriminant analysis models, partial least squares discriminant analysis models, random tree models, logistic regression models, naïve Bayes models, K-nearest neighbor models, quadratic discriminant analysis models, anomaly detection models, boosted and bagged decision tree models, C4.5 models, k-means models, and/or other multi-layer non-linear models. Neural networks can include recurrent neural networks (e.g., long short-term memory recurrent neural networks), feed-forward neural networks, and/or other forms of neural networks. For instance, supervised training techniques can be performed to train the model (e.g., using past probe insertion data) to determine an orientation and/or insertion action based at least in part on the feature(s) associated with the signal from the probe 100.

Referring now to FIG. 13, a view of the computer 202 of FIG. 12 installed with video processing instructions is illustrated in accordance with aspects of the present subject matter. For example, the memory device 210 may be installed with video processing instructions (e.g., software or firmware) that may be implemented by the processor 208. As such, for the illustrated embodiment, the probe 100 transmits to the computer 202 a first image 205 and a second image 207 captured by the camera(s) 122. The camera(s) 122 may also send a plurality of images 206 captured by the camera(s) 122 while the probe 100 is guided on the predetermined path 139. For instance, the images 206 can be captured at different locations along the predetermined path 139, at different views circumferentially relative to the probe centerline 114, or both. In some embodiments, the images 206 captured by the camera(s) 122 represent the entire internal structure of the apparatus 10, such as the combustor 26, along the predetermined path 139.

The video processing instructions are configured to recognize portions of the images 206 that contain overlapping structure. For instance, the video processing instructions recognize images 206 that were captured next to each other and contain shared boundary conditions. It should be recognized that the images 206 may not always capture equal areas of the apparatus 10 along the predetermined path 139. For example, the probe tip 104 may sag from the exact middle of the predetermined path 139. As such, the camera(s) 122 may be closer to one portion of the internal surface of the apparatus 10 than another portion of the internal surface. Because of potential sagging of the probe tip 104, some of the images 206 may capture the apparatus 10 closer and capture less area in the image 206. On the other hand, some of the images 206 may capture the apparatus 10 farther away and capture more area in the image 206. In embodiments where the camera centerline 135 is located a distance away from the probe centerline 114, the images 206 may also capture unequal areas of the internal surface of the apparatus 10.

Further, the computer 202 is configured to combine the plurality of images 206 using the video processing instructions to produce a single composite image 216 of the apparatus 10 along the predetermined path 139. For example, the computer 202 may combine the first image 205 and the second image 207 into a single composite image 216. In other embodiments, the computer 202 may combine a plurality of images 206, such as two or more, into a single composite image 216. As such, the composite image 216 may include the structure captured by the individual images 206 in a single image. In some embodiments, the composite image 216 may approximately represent a complete view of the internal structure of the apparatus 10 along the predetermined path 139. The video processing instructions may use a variety of methods to combine the individual images 206 into the composite image 216. For example, the video processing instructions may use image stitching and unwrapping with seam blending (such as for inputs from multiple cameras 122) or histogram-based image enhancement. In the situation where the images 206 represent uneven areas of the internal surfaces of the apparatus 10, the image processing instructions may include image registration, scale invariant feature extraction and pattern matching, machine leaning, or any combination of the preceding techniques or other techniques known in the art for stitching images together.

Figure 14:
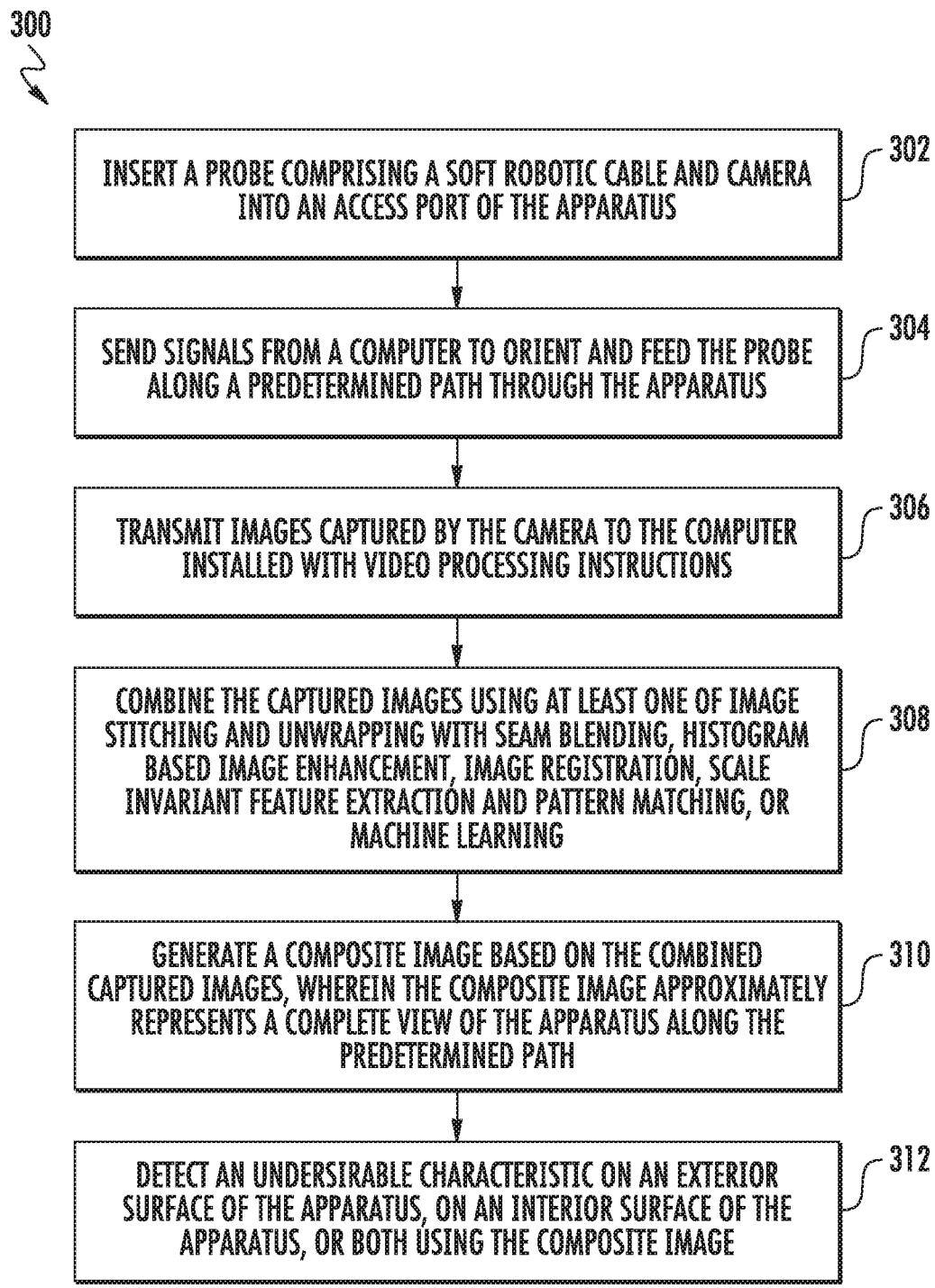
FIG. 14 illustrates a flow diagram of a method for inspecting an apparatus using a soft robotic probe and producing composite images according to aspects of the present subject matter.

Referring now to FIG. 14, a flow diagram of one embodiment of a method 300 for inserting and orienting a soft robotic probe 100 into an apparatus 10 and capturing images 206 is illustrated in accordance with aspects of the present disclosure. The method 300 may be used generally with the system 200 as described in FIGS. 4-13 or with any other capable system. The method 300 may use a probe 100 including a camera 122.

At step 302, the method 300 includes inserting the probe 100, including a soft robotic cable 111 and camera 122, into an access port 62 of the apparatus 10. Another step 304 includes sending signals from a computer 202 to orient and feed the probe 100 along a predetermined path 139 through the apparatus 10. Another step 306 includes transmitting images 206 captured by the camera 122 to the computer 202 installed with video processing instructions. In some embodiments, the method 300 may include halting the probe 100 at predetermined locations 133 to capture images 206 radially from the camera 122 of the probe 100. Further, for the exemplary embodiment, the images 206 captured together show views of the apparatus 10 at least partially around a circumference of a camera centerline 135.

In a different embodiment, the method 300 may include capturing images 206 continuously along the predetermined path 139 through the apparatus 10. Still, in another embodiment, the method 300 may include capturing views of a first portion of the apparatus 10 while the probe 100 is inserted into the apparatus 10. The orientation of the camera 122 may then be changed so that the camera 122 can capture a different portion of the apparatus 10. For example, the camera 122 may be rotated circumferentially relative to a camera centerline 135 as described in reference to FIG. 9. As such, for the depicted embodiment, the probe 100 is withdrawn from the apparatus 10 while capturing views of a second portion of the apparatus 10. Further, in one embodiment, the camera 122 may be continuously or discretely rotated while being inserted, withdrawn, or both. The method 300 may also include, at 308, combining the captured images 206 using at least one of image stitching and unwrapping with seam blending, histogram-based image enhancement, image registration, scale invariant feature extraction and pattern matching, or machine learning. For the embodiment shown, a further step 310 includes generating a composite image 216 based on the combined captured images 206. For example, the composite image 216 may approximately represent a complete view of the apparatus 10 along the predetermined path 139. Another step 312 of the exemplary method 300 includes detecting an undesirable characteristic on an exterior surface of the apparatus 10, on an interior surface of the apparatus 10, or both using the composite image 216.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for inserting and orienting a soft robotic probe into an apparatus and capturing images, the system comprising:
    a cable comprising an adjustable sheath at an exterior of the cable, wherein the adjustable sheath is defined around a probe centerline extending a length of the probe, and wherein the adjustable sheath extends and contracts the cable between a first length and a second length different from the first length;

an actuation assembly defined within the adjustable sheath, wherein the actuation assembly extends or contracts the cable between the first length and the second length, and wherein the actuation assembly adjusts an orientation of the cable, an orientation of a tip of the probe, or both along at least one axis; and a camera at the tip of the probe, wherein the camera captures images at least partially around a circumferential direction relative to a camera centerline.

2. The system of claim 1, wherein the probe further comprises a slip ring, the slip ring coupled to the camera and the cable, and wherein the slip ring rotates the camera along the circumferential direction.

3. The system of claim 1, further comprising:

a computer communicatively coupled to the probe, the computer configured to guide the probe on a predetermined path through the apparatus and capture the images at regular intervals, and wherein the computer is configured to combine the images captured at the regular intervals into a single composite image of the apparatus along the predetermined path.

4. The system of claim 1, wherein the adjustable sheath comprises a crimped braided sheath.

5. The system of claim 1, wherein the actuation assembly is coupled to an actuation source, the actuation source configured to receive a signal and elongate or shorten the actuation assembly.

6. The system of claim 1, further comprising:

a stiffening device extending the length of the cable and housed within the adjustable sheath, wherein the stiffening device provides rigidity to the cable.

7. The system of claim 6, wherein the stiffening device is coupled to at least one stiffening source, the stiffening source configured to receive a signal and provide rigidity to the stiffening device.

8. The system of claim 7, wherein the actuation assembly, the stiffening device, or both are coupled to a pressure source.

9. The system of claim 1, wherein the camera is rotated between a first position and a second position along the circumferential direction.

10. The system of claim 1, further comprising:

a plurality of cameras at the tip of the probe, wherein the cameras are oriented at different locations along the circumferential direction relative to the camera centerline.

11. The system of claim 1, wherein the probe further comprises a plurality of slidable segments, and further wherein the slidable segments extend along the length of the cable.

12. The system of claim 1, wherein the second length is approximately five times longer or more than the first length.

13. The system of claim 1, wherein the camera centerline is at a distance from the probe centerline.

14. A method for inserting and orienting a soft robotic probe into an apparatus and capturing images, the method comprising:

enabling at least one of extension or contraction of a cable between a first length and a second length using an actuation assembly within an adjustable sheath, the second length different from the first length, the cable including the adjustable sheath at an exterior of the cable, the adjustable sheath defined around a probe centerline extending a length of the probe;

facilitating adjustment, using the actuation assembly, of at least one of an orientation of the cable or an orientation of a tip of the probe along at least one axis; and facilitating, using a camera at the tip of the probe, capture of images at least partially around a circumferential direction relative to a camera centerline.

15. The method of claim 14, further comprising:

generating a composite image based on a combination of the captured images, wherein the composite image approximately represents a complete view of the apparatus along a predetermined path.

16. The method of claim 14, wherein facilitating the capture of the images includes:

halting the probe at predetermined locations to capture the images radially from the camera of the probe, wherein the images captured together show views of the apparatus at least partially around a circumference of the camera centerline.

17. The method of claim 14, further comprising:

capturing the images continuously along a predetermined path through the apparatus.

18. The method of claim 14, further comprising:

detecting an undesirable characteristic on an exterior surface of the apparatus, on an interior surface of the apparatus, or both using a composite image formed from a combination of the captured images.

19. The method of claim 14, further comprising:

capturing views of a first portion of the apparatus while the probe is inserted into the apparatus;

changing an orientation of the camera; and withdrawing the probe from the apparatus while capturing views of a second portion of the apparatus.

20. The method of claim 14, further comprising:

combining the captured images using at least one of image stitching and unwrapping with seam blending, histogram-based image enhancement, image registration, scale invariant feature extraction and pattern matching, or machine learning.

* * * * *